Patented June 11, 1929.

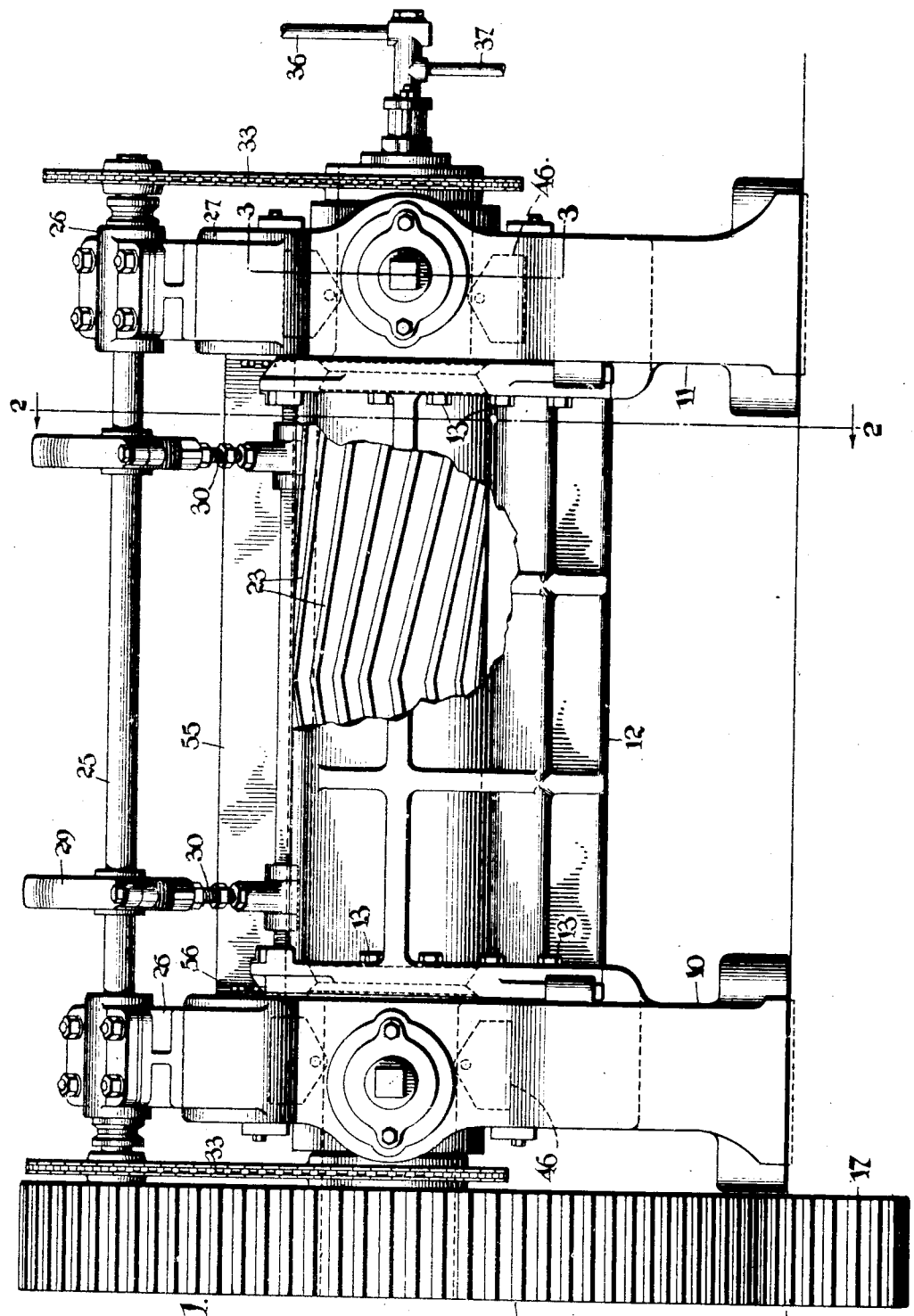

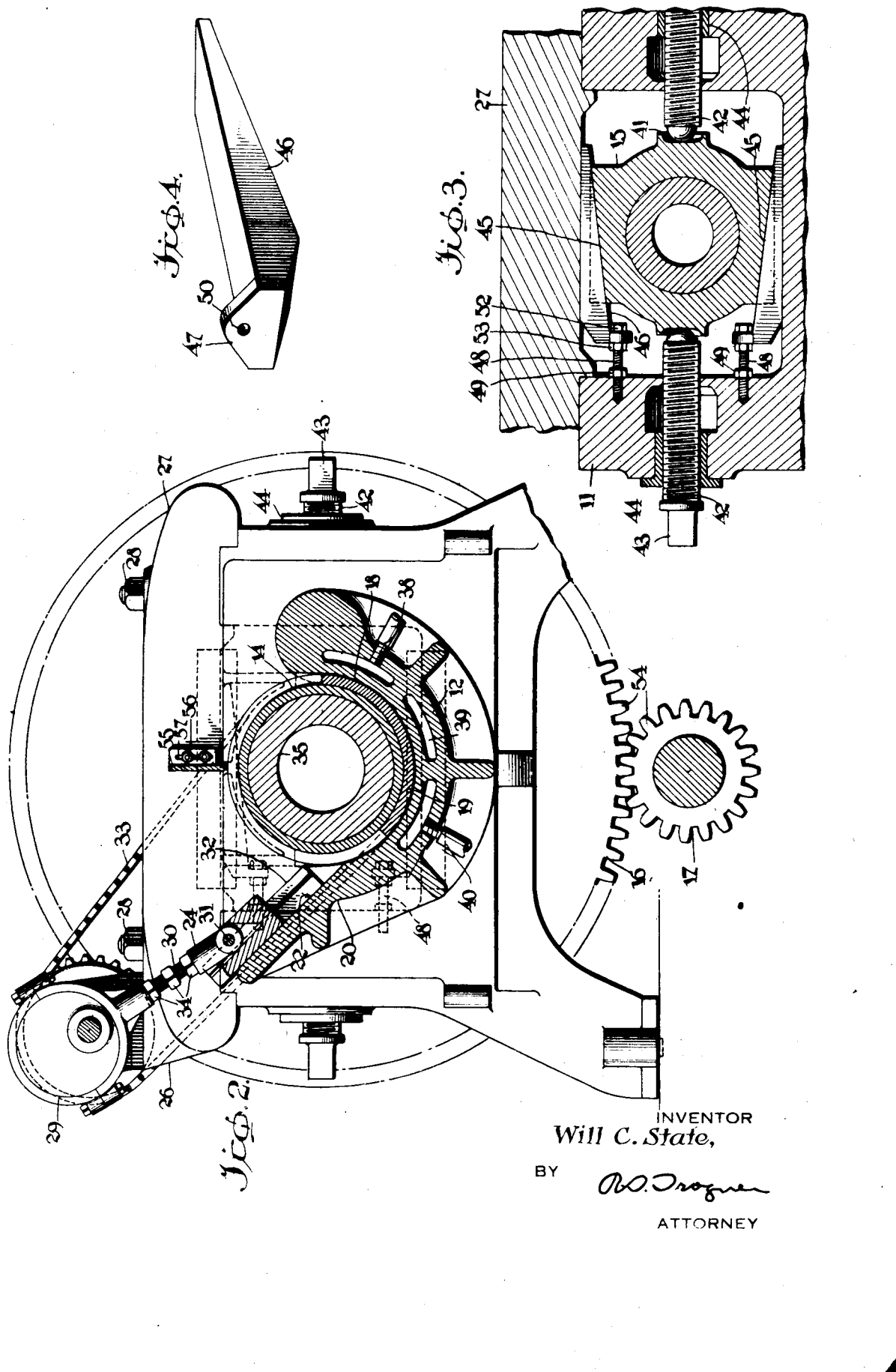

1,717,126

UNITED STATES PATENT OFFICE.

WILL C. STATE, OF AKRON, OHIO, ASSIGNOR TO THE GOODYEAR TIRE & RUBBER COMPANY, OF AKRON, OHIO, A CORPORATION OF OHIO.

GRINDING MILL FOR RUBBER.

Application filed May 28, 1925. Serial No. 33,450.

This invention relates to grinding machines and it has particular relation to machines adapted to grind or crush rubberized fabric and cured rubber or like material.

One object of my invention is to provide a grinding machine so constructed as to materially reduce the labor required in securing quantity production.

Another object of my invention is to provide a machine constructed of a combination of parts and improved features that render it peculiarly adaptable for grinding rubber stock and rubberized fabric or similar materials.

A still further object of my invention is to provide a machine adapted to be adjusted to conform to various conditions under which material is ground or crushed and provided with features that will permit of continuous operation without causing overheating of the mechanism.

In the automobile tire industry, it has been found to be of advantage to reclaim rubber from used vulcanized stock of solid rubber or used rubberized fabric. This material must be ground or crushed in order to conveniently prepare it for treatment necessary in the course of the reclaiming process.

I am aware that various machines for grinding different materials have heretofore been employed. However it is the aim of the present invention to construct an improved machine embodying a novel combination of parts especially adapted for grinding material of the above designated character. It is to be understood that this machine may be adapted for use in grinding or crushing various other materials than those mentioned, without departing from the spirit of this invention.

A machine constructed in accordance with the principles of my invention consists, generally, of a grooved crushing roll journalled in suitable supports and rotatably driven from a convenient source of power, through reducing gearing. A receptacle or hopper having a concave surface is secured to the supports and partially surrounds the grinding roll in such manner as to permit material to be ground to be placed on the hopper and crushed between the surfaces of the roll and hopper. One side of the hopper is formed with a flat inclined surface merging into the concave portion.

Associated with the roll and hopper is a feeder mechanism, positioned above and at one side of the hopper and secured to the supports carrying the grinding roll. This feeder mechanism consists of a horizontal shaft journalled adjacent the top of the support and provided with eccentric bearings, the latter being connected by means of actuating rods to a reciprocating member, which is adapted to be actuated along the flat surface of the hopper, thus serving to press the proper amount of material between the crushing surface of the roll and hopper. The reciprocating mechanism is driven by sprocket chain gearing connected to the outer portions of the roll and to the rod carrying the eccentric bearings.

I have provided a cooling system which circulates water through openings in the roll and hopper to prevent these members from becoming overheated during the operation of the machine.

I have also provided movable bearing members for the roll, so constructed and arranged as to permit adjustment in both horizontal and vertical directions, thus providing means whereby the material may be ground finely or coarsely as desired.

For a better understanding of my invention reference may now be had to the accompanying drawings forming a part of the specification, in which:

Fig. 1 is a side-elevational view of my machine, parts being broken away;

Fig. 2 is a cross-sectional view taken substantially on the line II—II of Fig. 1;

Fig. 3 is a fragmentary cross-sectional view taken substantially on the line III—III of Fig. 1; and Fig. 4 is a perspective view of one of the wedge members employed in my invention.

In practicing my invention, I have provided two supporting members 10 and 11 which are adapted to be rigidly secured to any suitable foundation. These members are spaced considerably to receive therebetween a hopper 12 which is secured at its ends by means of bolts 13, to the respective supporting members. A roll 14 is disposed within the hopper and is journalled in bearing blocks 15, carried by the members 10 and 11. The ends of the roll 14 project beyond the supports; one of the ends being provided with a gear wheel 16 which is keyed to the roll 14 and intermeshes with a second relatively small gear wheel 17, the latter being connected to some convenient source of power, not shown.

It will be noted by reference to Fig. 2 that the hopper 12 is provided with a concave surface 18, which may be lined with suitable hardened metal, as indicated at 19. The hopper 12 includes a flared portion 20, which extends upwardly and is provided with an inclined surface 22, the object of which will be described later. The concave surface of the hopper or the lining of hardened metal may be roughened or grooved in order to present an efficient grinding surface cooperating with the grinding surface of the roll. Likewise the roll 14 is provided with a roughened surface or a number of grooves, indicated at 23, which extend along the roll substantially the length of the hopper 12 and cooperate with the roughened surface of the hopper.

In order to facilitate the feeding of material to be ground between the grinding surfaces of the roll and hopper, I have provided a reciprocating feeder mechanism 24, which is mounted horizontally at the top of the supports 10 and 11 upon a rod 25, journalled in the bearings 26. These bearings are supported or formed integrally with reinforcing cross members 27, the latter fitting over the bearing blocks 15 and being bolted to the supports 10 and 11 by means of nuts and bolts 28. The rod 25 is provided with eccentrics 29 which are directly connected to adjusting rods 30, the latter being pivoted by means of bolts 31 to a flat reciprocating member 32 which rests upon the inclined surface 22 of the hopper and is adapted to reciprocate upon the surface when the rod 25 is rotated. In order to rotate the rod 25, I have provided a sprocket chain 33 trained about a sprocket wheel on the rod 25 and another sprocket wheel on the roll 14 and consequently it is driven by the same power that drives the roll 14. The rod 30 is provided with adjusting nuts 34 by the manipulation of which the reciprocating member 32 may be positioned nearer or farther away from the roll 14 as desired.

Because of the friction created between the grinding surfaces of the roll and hopper and the material which is ground, there is a tendency for these parts to become overheated. In order to prevent damage to the material from this cause, I have provided a cooling system which permits cool water to be admitted into the hollow portion 35 of the roll through a pipe 36, from any convenient source of water supply. A continuous stream of water may be admitted through the pipe 36 and allowed to escape through an outlet pipe 37. There is also a water supply pipe 38 for the hopper 12 which communicates with the openings 39 and after circulating through these openings is allowed to escape through the outlet pipe 40.

It may be desired to adjust the roll 14 in order to provide for finer or coarser grinding of the material. I have provided a novel means for adjusting this roll, which consists of a movable bearing block 15 provided with concave bearing surfaces 41 and adapted to be adjusted horizontally by means of set screws 42. The latter are provided with square heads 43 over which a suitable wrench may be applied to turn the screw and thus force the end thereof against the bearing surface 41. The set screws are threaded into sleeves 44 rigidly secured to the supporting members 10 and 11. The block 15 is provided at its upper and lower portion with inclined surfaces 45 which are adapted to support wedge members 46. These wedge members are provided with ears 47 through which bolts 48 are adapted to extend. The bolts 48 are screwed into the supporting member 11 and rigidly secured in position by means of lock nuts 49. Each of the bolts 48, which are threaded, fits loosely through holes 50 provided in the ears of the wedges and by means of the nuts 52 and 53, the wedges may be adjusted horizontally along the inclined surfaces 45 of the bearing block. When this adjustment is made, it will be seen that the bearing block 15 and the roll 14 may be adjusted in a vertical direction. The adjustments above described are of small degree as it is only necessary to move the roll silghtly with respect to the concave surface of the hopper in order to materially alter the degree of mastication of the material. The teeth 54 of the gear wheels 16 and 17 are accordingly made large enough to allow for this adjustment without interfering with the operation of the machine. Likewise the sprocket chain gearing 33 is only tightened or loosened to a slight degree in the course of these adjustments which is not sufficient to interfere with the operation of the reciprocating feeder mechanism.

While rubber stock or other material is being ground some of it is likely to have a tendency to adhere to the roll and be carried between the crushing surfaces more than once. In order to prevent this undesirable action, I have provided a shield 55 of relatively thin metal, positioned adjacent the top of the roll longitudinally thereof and secured at its ends by means of bolts 56 threaded into the cross members 27. The ends of the shield are turned at angles and formed with slots 57 which receive the bolts 56 and provide for adjustment of the shield toward and away from the roll. Thus it will be apparent that the lower edge of the shield may be positioned as close to the surface of the roll as required regardless of the change of position of the roll by reason of its adjustment. If it is desirable to provide for greater capacity of the hopper by extending the sides thereof farther upwardly, the shield will serve as a partition to separate unground material from that which has passed through the machine.

The operation of the machine is simple and obvious, as indicated by the foregoing description and it is therefore deemed unnecessary to resort to a separate detailed explanation thereof.

Although I have illustrated but one form which my invention may assume, and have described in detail but a single application thereof, it will be apparent to those skilled in the art that it is not so limited, but that various minor modifications and changes may be made therein without departing from the spirit of my invention or from the scope of the appended claims.

What I claim is:

1. A grinding machine comprising a hopper having a rigidly supported concave grinding surface and an inclined flat surface extending therefrom at one edge, a grinding roll operatively associated with the grinding surface and a relatively thin member adapted to reciprocate upon the flat surface.

2. A grinding machine provided with a hopper having a rigidly supported concave grinding surface, a grinding roll operatively associated with the grinding surface and a continuously operating feed mechanism adapted to supply material from within the hopper to the grinding surface while the hopper is being refilled.

3. A grinding machine comprising a hopper having a concave grinding surface and an inclined flat surface extending therefrom at one edge, a grinding roll operatively associated with the grinding surface, a relatively thin member adapted to reciprocate upon the flat surface and a single means adapted to drive the member and the roll synchronously.

4. A grinding machine comprising a hopper having a concave grinding surface, a roll disposed within the grinding surface, a feeder mechanism reciprocating in sliding relation in the hopper adjacent the roll, the mechanism being operated through the medium of eccentrically mounted members operatively connected therewith and a sprocket chain gearing operatively connecting the roll and feeder mechanism.

5. A grinding machine adapted to crush rubber material comprising a hopper having a concave grinding surface, an inclined flat surface extending therefrom at one edge, a grinding roll arranged within the grinding surface and adapted to cooperate therewith in grinding the material within the hopper and means adapted to adjust the relative position of the roll and the concave surface.

6. A grinding machine comprising a hopper provided with a concave grinding surface, a grooved roll disposed within said grinding surface, a rotatable rod provided with eccentric bearings supported above said hopper, a feeder slidably reciprocable within the hopper provided with rods connected to the eccentric bearings and sprocket chain gearing connecting the rod and roll.

7. In combination, a supporting means for a hopper provided with a concave grinding surface, a roll disposed within said grinding surface having journal bearings in the supporting means, means for horizontally and vertically adjusting the journal bearings of the roll and eccentrically driven reciprocating means slidable within the hopper adapted to feed material to be ground to the grinding surface and roll.

8. In combination, supporting means provided with a hopper, having a concave grinding surface, a grinding roll disposed within said grinding surface, the rolls being journalled in the supporting means, means for horizontally and vertically adjusting the roll and a water cooling system associated with said roll.

9. In combination, supporting members provided with a hopper, having a concave grinding surface, a grinding roll disposed in said grinding surface having journal bearings in the supporting members, means for adjusting the roll in two directions and a cooling system adapted to circulate water through the roll and hopper.

10. In combination, supporting members provided with a hopper, having a concave grinding surface, a grinding roll disposed in said grinding surface having journal bearings in the supporting members, a feeder mechanism disposed in the hopper adjacent the roll, a shaft rotatably mounted on the supporting members provided with eccentric bearings, rods connecting the feeder mechanism and eccentric bearings, sprocket chain gearing connecting the roll and shaft and a water cooling system for the roll and hopper.

In witness whereof, I have hereunto signed my name.

WILL C. STATE.